United States Patent [19]

Colliopoulos et al.

[11] 3,966,632

[45] June 29, 1976

[54] VEGETABLE OIL EMULSION

[75] Inventors: John A. Colliopoulos, Evanston; Nicholas S. Yanick, Elmhurst, both of Ill.

[73] Assignee: G. D. Searle & Co., Chicago, Ill.

[22] Filed: June 6, 1974.

[21] Appl. No.: 476,953

[52] U.S. Cl. ............................... 252/309; 106/244; 252/356; 424/365; 426/602; 426/604; 426/605; 426/653

[51] Int. Cl.² ..................... A23D 3/00; A23D 5/00; B01F 17/34

[58] Field of Search .............. 252/309, 356; 426/10, 426/602, 604

[56] References Cited
UNITED STATES PATENTS

| | | | |
|---|---|---|---|
| 2,223,558 | 12/1940 | Epstein | 252/356 X |
| 2,482,724 | 9/1940 | Baker | 426/10 X |
| 2,940,860 | 6/1960 | Sarett | 426/10 |
| 3,006,815 | 10/1961 | Scott | 426/10 X |
| 3,193,393 | 7/1965 | Scott | 426/10 X |
| 3,248,227 | 4/1966 | Martin | 252/356 X |
| 3,338,720 | 8/1967 | Pichel | 426/602 |
| 3,360,378 | 12/1967 | Spitzer | 426/604 |
| 3,654,178 | 4/1972 | Kauder | 252/356 |
| R21,322 | 1/1940 | Harris | 252/356 X |

FOREIGN PATENTS OR APPLICATIONS 731,934   6/1955   United Kingdom

*Primary Examiner*—Herbert B. Guynn
*Attorney, Agent, or Firm*—John J. McDonnell

[57] ABSTRACT

The present invention is concerned with a vegetable oil emulsion containing from 1-10% water, preferably 1-5% water, and 1-4% emulsifying agent. The emulsifying agent is a particular mixed polyglycerol ester of 12-hydroxy-9 octadecenoic acid or of dimerized fatty acids of soybean oil. These water-in-oil (w/o) emulsions are useful in preparing edible food products, cosmetics and paints containing a minimum amount of water.

4 Claims, No Drawings

VEGETABLE OIL EMULSION

The present invention is concerned with stable water-in-oil (w/o) emulsions of vegetable oil. In particular, soybean, cottonseed, corn, safflower, and linseed are suitable oils for these emulsions with soybean oil being most preferred. These emulsions are characterized by their exceptionally small water content. These emulsions contain between 1 and 10% water and 1 and 4% emulsifying agent with the preferred range being about 3.5% water and about 2.5% emulsifying agent.

Generally w/o emulsions are difficult to prepare and once prepared, are usually not very stable. The present invention overcomes this difficulty by using emulsifying agents which unexpectedly provide emulsions physically stable for one year, of vegetable oil containing a minimum of water.

Polyglycerol esters of dimerized fatty acids of soybean oil wherein the polyglycerol moiety is predominantly di-, tri and tetra-glycerol characterized as follows:

| | |
|---|---|
| Acid value | 6 mg. KOH/gm. |
| Peroxide value | <1 |
| Hydroxyl value | 60–70 |
| Viscosity (Gardner tube) | 6–7 |
| Saponification value | 170–175 |
| Iodine value | 78–82 |
| Specific gravity of 25° | 0.97 | and sold under the trademark Homodan PT and ricinoleic (12-hydroxy-9-octadecenoic) acid ester of a mixture of di-, tri-, and tetra-polyglycerols characterized as follows:

| | |
|---|---|
| (a) peroxide value | <1 |
| (b) saponification number | 165–169 |
| (c) iodine number | 85–88 | and sold under the tradename Homodan PR are suitable emulsifying agents. Homodan PT and Homodan PR are sold by Akteiselskabet Grindstedvaerket (Denmark).

Thus emulsions containing 86–98% vegetable oil, preferably soybean oil, 1–10% water and 1–4% emulsifying agent of esters of a mixture of di-, tri- and tetra-polyglycerols and acid wherein the acid is dimerized fatty acids of soybean oil wherein the resulting esters have a saponification value of 170–175 or 12-hydroxy-9-octadecenoic acid wherein the resulting esters have a saponification value of 165–169 are included.

Glyceryl mono-oleate, propyleneglycol lacto stearate, decaglycerol tetra-oleate, triglycerol mono-oleate, decaglycerol decaoleate, sorbitan mono-oleate, diglycerol mono-oleate, sorbitan mono-stearate, and mono and diglycerides are among common emulsifying agents which are unsuitable for preparing stable emulsions of vegetable oil particularly soybean oil containing less than 10% water. Unexpectedly Homodan PT and Homodan PR produce stable emulsions with soybean vegetable oil particularly oil containing less than 10% water. Several factors dictate the use of emulsions as herein described. W/o emulsions of the minimum level of dispersed water have numerous industrial applications for economical and functional reasons. These water-in-oil (w/o) emulsions serve as an emulsion concentrate from which other emulsions and products can be prepared. Since the emulsions of this invention contain very small amounts of water, foods, paints and cosmetics likewise having very small amounts of water can be prepared from them.

The presence of water provides for pH control of the solution as well as for the use of water soluble components such as anti-oxidants, colors and flavors.

These emulsions can be made stable to oxygen by the addition of anti-oxidants. Both water soluble and fat soluble anti-oxidants are suitable for stabilizing these emulsions. Butylated hydroxyanisole, butylated hydroxytoluene, tocopherols, propyl gallate, citric acid, ascorbic acid, EDTA, glucose oxidase are suitable but not exclusive anti-oxidants which protect the herein described emulsions from oxidative deterioration. Anti-oxidants preserve the taste, odor and appearance of the emulsions.

An effective amount of anti-oxidant is that amount which preserves the taste and odor of an emulsion in the presence of oxygen. Glucose-glucose oxidase/catalase is a preferred water soluble anti-oxidant system. 50 Parts of water containing 5 parts glucose, about 300 units of glucose oxidase, about 150 units of catalase is an effective amount of glucose-glucose oxidase/catalase for about 1500 parts of soybean oil. Those skilled in the art will recognize that an effective amount, i.e. the amount of anti-oxidant to preserve taste and odor of the emulsion, will vary according to the extent and duration of exposure to oxygen. The above proportions are merely representative of an effective anti-oxidant system. Glucose is the limiting reagent for the total amount of oxygen consumed. A unit of catalase is that amount of catalase which will decompose 264 mg of hydrogen peroxide under the conditions of assay. The method for determining catalase activity is described by Scott D. and Hammer F. in Enzymologia 22 194 (1960).

A unit of glucose oxidase activity is defined as that quantity of enzyme which will cause the uptake of 10mm$^3$ oxygen per minute in a Warburg manometer at 30°C. in the presence of excess air and excess catalase with a substrate containing 3.3% glucose monohydrate and 0.1 M phosphate buffer at pH 5.9 with 0.4% sodium dehydroacetate. (Scott, J. Agric. Food Chem. 1 727 (1953)).

$$\text{glucose oxidase units/g. or ml.} = \frac{P \times C \times D}{30 \text{ minutes} \times 10 \text{ mm}^3 \times V}$$

Where: $P =$ pressure drop observed in reaction flask corrected for thermobarometer change, Umbreit et al., Manometric Techniques, 3rd Edition, 6–7, Burgess Pub., Minneapolis, Minn., 1957
$C =$ reaction flask constant, Umbreit et al., ibid., 61–63
$D =$ dilution factor of enzyme solution
$V =$ volume of enzyme solution in reaction flask The emulsions of the present invention are particularly desirable in that they may be stabilized toward oxygen with a variety of anti-oxidant systems or combinations of anti-oxidant systems. Thus, glucose-glucose oxidase/catalase is a water soluble anti-oxidant system which inhibits oxidation by removing oxygen. EDTA is an anti-oxidant which chelates with metal ions and inhibits metal ion catalysed oxidation. Lipid soluble anti-oxidants such as tocopherols inhibit oxidation by terminating the propagation of free radical chain reactions within the lipid phase.

These emulsions have broad applications in the food industry. They may be used in the baking industry as shortening for breads and pastries. These emulsions can also be used in the manufacture of mayonnaise or margarine. The low water content of the present emulsions make them particularly advantageous for cooking purposes when compared to those containing large amounts of water in that spattering of hot oil is reduced. These emulsions also find application as water-in-oil bases for cosmetics and paints.

EXAMPLE 1

200 Parts of soybean oil are heated to 40°C. and 40 parts of Homodan PT are added and the emulsifier is thoroughly dissolved in the oil. 1400 Parts of soybean oil is placed in a Hobart mixer at 120 rpm and the above mentioned blend is added. This combination is mixed at 120 rpm for 1 minute and then 56 parts of water is gradually added in a small stream. The mixed emulsion is placed in a colloid mill and emulsified using a 0.004" rotor-stator gap at 7500 rpm for 3 minutes, and is then physically stable for one year.

EXAMPLE 2

200 Parts of soybean oil are heated to 40°C. and 40 parts of Homodan PR are added and these components are thoroughly blended together. 1400 Parts of soybean oil is placed in a Hobart mixer at 120 rpm and the above mentioned blend is added. This combination is mixed at 120 rpm for 1 minute and then 56 parts of water is gradually added in a small stream. The mixed emulsion is placed in a colloid mill and emulsified using a 0.004" rotor-stator gap at 7500 rpm for 3 minutes, and is then physically stable for one year.

EXAMPLE 3

As in Example 1, wherein the aqueous phase is 56 parts of a solution prepared from 5 parts of glucose, 2.50 parts of $EDTA.Na_2$, 0.57 part of sodium citrate.$2-H_2O$, 307 units of glucose oxidase and 158 units of catalase and 500 parts of water. A suitable glucose oxidase/catalase preparation is sold under the tradename Fermcozyme CBB-single strength by Searle Biochemics, Division of G. D. Searle & Co.

Tables 1 and 2 summarize the results of flavor evaluation by 6 experienced panelists of emulsion number 2 as described in this example and emulsion number 1, an emulsion not containing glucose-glucose oxidase/catalase anti-oxidant system. From the data in Table 1 it is evident that a desirable buttery taste is maintained and undesirable fishy, painty, and rancid taste is absent in the stabilized emulsion.

Table 1

Storage Time: 43 weeks at room temperature

| Flavor Identification | Emulsion 1 | Emulsion 2 |
|---|---|---|
| Buttery | (2) | (2) |
| Nutty | (0) | (2) |
| Beany | (0) | (1) |
| Grassy | (1) | (0) |
| Rancid | (3) | (0) |
| Painty | (1) | (0) |
| Fishy | (1) | (0) |
| Corny | (1) | (1) |

( ) = times mentioned.

Table 2 clearly indicates the anti-oxidant ability of the glucose-glucose oxidase/catalase system in water-in-oil emulsions. (Emulsion 2 compared to the emulsion not containing glucose oxidase/catalase.)

Table 2

Mean Rating for overall flavor evaluation of Emulsions 1 and 2 from 43 weeks storage study.

| Flavor Evaluation | Emulsion 1 | Emulsion 2 |
|---|---|---|
| Choice (9–10) | | |
| Good (7–8) | | |
| Fair (6–5) | | |
| Unpleasant (3–4) | | |
| Repulsive (1–2) | | |
| Mean Rating | 3.8 | 7.5 |

What is claimed is:
1. A water in oil emulsion comprising:
   a. 91–98% soybean oil;
   b. 1–5% water; and
   c. 1–4% esters of a mixture of di-, tri-, and tetra-polyglycerols and 12-hydroxy-9-octadecenoic acid, said esters having a saponification value of 165–169.
2. As in claim 1, an emulsion stabilized toward oxygen by an effective amount of anti-oxidant.
3. As in claim 1, an emulsion stabilized toward oxygen by an effective amount of glucose-glucose oxidase
4. As in claim 1, an emulsion comprising:
   a. 94% soybean oil;
   b. 3.5% water; and
   c. 2.5% esters of a mixture of di-, tri- and tetra-polyglycerols and 12-hydroxy-9-octadecenoic acid, said esters having a saponification value of 165–169.

* * * * *